US012652442B2

(12) United States Patent
Liang et al.

(10) Patent No.: US 12,652,442 B2
(45) Date of Patent: Jun. 9, 2026

(54) VIDEO TRANSMISSION SYSTEM WITH PHYSICAL LAYER RETRANSMISSION AND REAL-TIME TRANSMISSION FUNCTIONS

(71) Applicant: NOREL SYSTEMS LIMITED, Tianjin (CN)

(72) Inventors: Ke Liang, Tianjin (CN); Yuanlong Wang, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 82 days.

(21) Appl. No.: 18/743,255

(22) Filed: Jun. 14, 2024

(65) Prior Publication Data

US 2024/0334023 A1 Oct. 3, 2024

Related U.S. Application Data

(63) Continuation of application No. PCT/CN2023/073543, filed on Jan. 28, 2023.

(30) Foreign Application Priority Data

Jan. 29, 2022 (CN) .......................... 202210110480.1

(51) Int. Cl.
*H04N 21/6375* (2011.01)
(52) U.S. Cl.
CPC ............................... *H04N 21/6375* (2013.01)
(58) Field of Classification Search
CPC ................................................ H04N 21/6375
See application file for complete search history.

(56) References Cited

U.S. PATENT DOCUMENTS 10,334,322 B1 * 6/2019 Seddon .................. H04L 65/752
2004/0257469 A1 * 12/2004 Compton ........... H04N 21/4305
375/E7.278

(Continued)

FOREIGN PATENT DOCUMENTS

CN 113132063 A 7/2021
CN 114584264 A 6/2022
JP 2001119437 A 4/2001

OTHER PUBLICATIONS

International Search Report of PCT/CN2023/073543, Apr. 26, 2023.

(Continued)

*Primary Examiner* — Randy A Flynn
(74) *Attorney, Agent, or Firm* — Troutman Pepper Locke LLP; Tim Tingkang Xia, Esq.

(57) ABSTRACT

A video transmission system includes a first transmission terminal, a second transmission terminal and a transmission channel. The first transmission terminal includes a transmission memory, and stores a retransmittable data packet into the transmission memory and sends the retransmittable data packet to the second transmission terminal. The second transmission terminal judges the abnormal state of the received retransmittable data packet, generates and sends retransmission control information according to a judgment result. The first transmission terminal retransmits the retransmittable data packet to the second transmission terminal according to the retransmission control information. The first transmission terminal sends a real-time data packet to the second transmission terminal. The real-time data packet is used to transmit video timing control signals. The second transmission terminal receives the real-time data packet sent by the first transmission terminal, and does not generate retransmission control information regardless of whether the received real-time data packet is correct.

13 Claims, 4 Drawing Sheets

(56)　　　　　　References Cited

U.S. PATENT DOCUMENTS

| 2012/0170445 | A1 | 7/2012 | Perumanam et al. |
| 2012/0269150 | A1* | 10/2012 | Delorme ................. H04L 69/16 |
| | | | 370/329 |
| 2015/0085190 | A1* | 3/2015 | Iwami ................ H04N 21/4126 |
| | | | 348/500 |
| 2017/0097867 | A1* | 4/2017 | Glaser .................... H04L 1/008 |
| 2019/0146883 | A1* | 5/2019 | Miyazaki ............. H04N 21/816 |
| | | | 709/219 |

OTHER PUBLICATIONS

Tian Yuan et al., Multi-Channel MAC Protocol with Radio Power Control for Mobile Ad Hoc Networks, Computer Engineering and Design, vol. 28, No. 9, 2007.

* cited by examiner

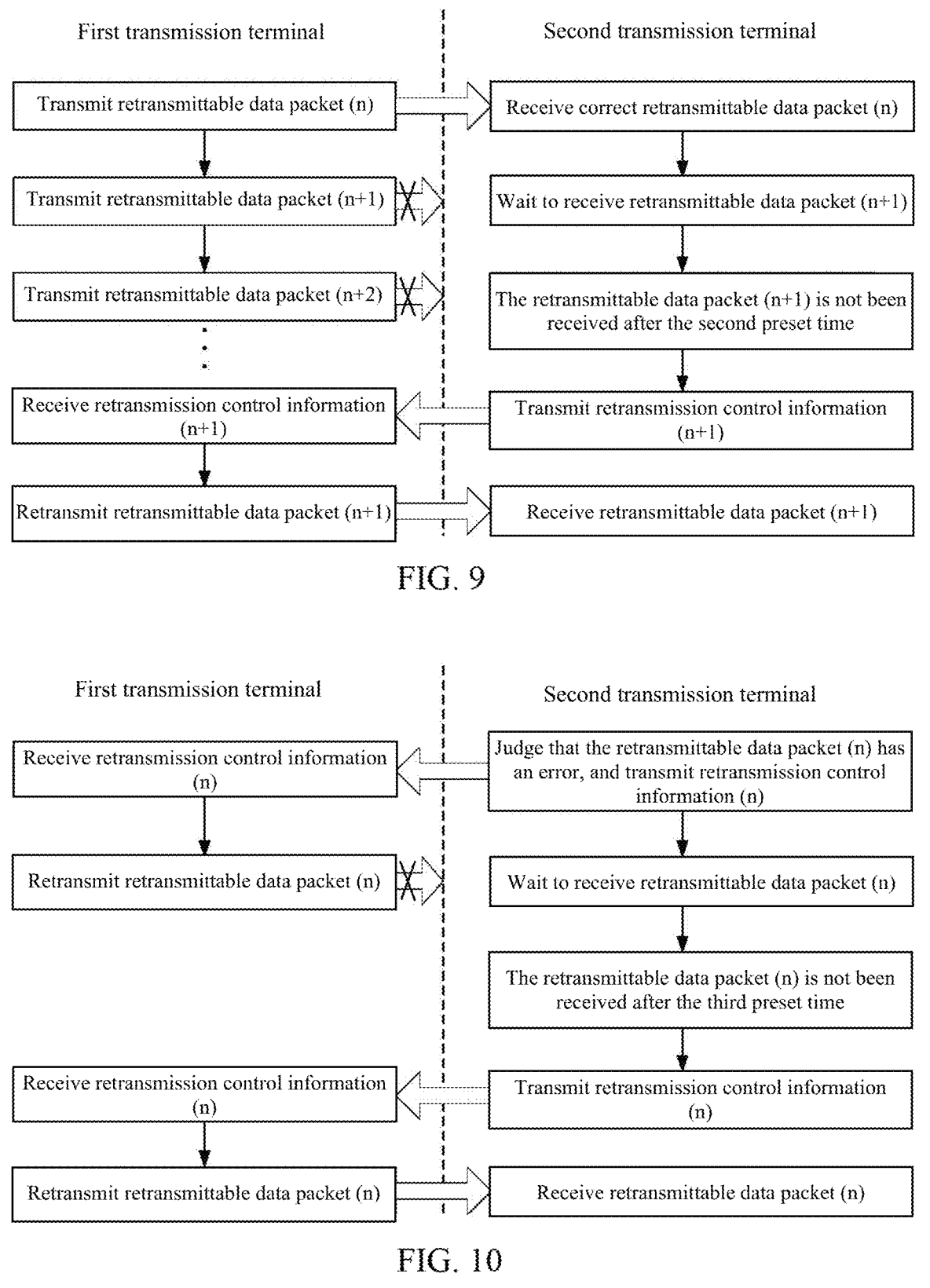

First transmission terminal                                    Second transmission terminal

| Transmit retransmittable data packet (n) | ⟹ | Receive correct retransmittable data packet (n) |

| Transmit retransmittable data packet (n+1) | ⤬ | Wait to receive retransmittable data packet (n+1) |

| Transmit retransmittable data packet (n+2) | ⤬ | The retransmittable data packet (n+1) is not been received after the second preset time |

| Receive retransmission control information (n+1) | ⟸ | Transmit retransmission control information (n+1) |

| Retransmit retransmittable data packet (n+1) | ⟹ | Receive retransmittable data packet (n+1) |

FIG. 9

First transmission terminal                                    Second transmission terminal

| Receive retransmission control information (n) | ⟸ | Judge that the retransmittable data packet (n) has an error, and transmit retransmission control information (n) |

| Retransmit retransmittable data packet (n) | ⤬ | Wait to receive retransmittable data packet (n) |

|  |  | The retransmittable data packet (n) is not been received after the third preset time |

| Receive retransmission control information (n) | ⟸ | Transmit retransmission control information (n) |

| Retransmit retransmittable data packet (n) | ⟹ | Receive retransmittable data packet (n) |

FIG. 10

VIDEO TRANSMISSION SYSTEM WITH PHYSICAL LAYER RETRANSMISSION AND REAL-TIME TRANSMISSION FUNCTIONS

CROSS-REFERENCE TO RELATED APPLICATION

This application is a continuation application of International Patent Application No. PCT/CN2023/073543, filed on Jan. 28, 2023, which itself claims priority to and benefit of Chinese Patent Application No. 202210110480.1 filed on Jan. 29, 2022 in the State Intellectual Property Office of P. R. China. The disclosure of each of the above applications is incorporated herein by reference in its entirety.

TECHNICAL FIELD

The present application relates to the technical field of communication, in particular to a video transmission system with physical layer retransmission and real-time transmission functions.

BACKGROUND

In data transmission protocols, retransmission is a common method to ensure the reliability of data transmission, such as TCP protocol. In the protocols that support retransmission, the real-time data transmission cannot be guaranteed because the time for data to arrive at the receiving terminal safely from the sending terminal is uncertain. If it is necessary to improve the real-time performance of data transmission, the retransmission mechanism cannot be used to ensure the reliability of data transmission, such as UDP protocol.

TCP and UDP are both transport layer protocols. Compared with the retransmission mechanism in the upper layer protocols such as the transport layer, the retransmission mechanism in the physical layer is beneficial to reduce the delay of retransmitted data, which is particularly important in applications such as vehicle-mounted driver assistance systems that require strict delay in video data transmission.

In the field of vehicle-assisted driving, not only the transmission delay of video data is required to be small, but also the transmission of video data is usually required to have high reliability, while some data have higher requirements for the real-time transmission of data, such as line synchronization and frame (field) synchronization signals in video signals. At this time, part of the reliability of data transmission can be sacrificed in exchange for the guarantee of real-time transmission of data.

At present, there is a lack of a method which can not only transmit video data with low delay and high reliability, but also transmit video timing control signals with high real-time. Therefore, it is necessary to study a video data transmission system with both physical layer retransmission and real-time transmission functions, so that the system can simultaneously transmit low-delay and high-reliability video data and high-real-time video timing control signals.

SUMMARY

The technical problem to be solved by the present application is how to realize a video data transmission system with the functions of physical layer retransmission and real-time transmission, so that the system can simultaneously transmit low-delay high-reliability video data and high-real-time video timing control signals.

As a video transmission system with physical layer retransmission and real-time transmission functions according to the present application includes a first transmission terminal, a second transmission terminal and a transmission channel, wherein the first transmission terminal sends a downlink data packet to the second transmission terminal through the transmission channel, and the second transmission terminal sends retransmission control information to the first transmission terminal through the transmission channel.

The downlink data packet includes a retransmittable data packet and a real-time data packet, and the downlink data packet contains a data packet type field to distinguish the retransmittable data packet from the real-time data packet. The downlink data packet contains a data packet type field to distinguish the retransmittable data packet from the real-time data packet. The retransmittable data packet has a same structure as the real-time data packet, and both the retransmittable data packet and the real-time data packet contain a data packet header, a data packet payload, a check code field, and a same field in the retransmittable data packet has a same data length as the real-time data packet. The real-time data packet has a higher priority than the retransmittable data packet.

The video timing control signal comprises one or more of a frame synchronization signal, a field synchronization signal and a line synchronization signal.

The first transmission terminal comprises a transmission memory.

When a first transmission terminal sends a retransmittable data packet to a second transmission terminal, the retransmittable data packet is stored in a transmission memory and sent to the second transmission terminal, wherein the retransmittable data packet contains a serial number, and a plurality of serial numbers contained in a plurality of consecutive retransmittable data packets are arranged in sequence according to the sending order. The second transmission terminal receives the retransmittable data packet sent by the first transmission terminal, judges the abnormal state of the received retransmittable data packet, and generates retransmission control information if it is judged that the retransmittable data packet is abnormal, wherein the retransmission control information includes the serial number of the retransmittable data packet to be retransmitted, and the first transmission terminal retransmits the retransmittable data packet to the second transmission terminal according to the retransmission control information.

When the first transmission terminal sends a real-time data packet to the second transmission terminal, the real-time data packet is not stored in the transmission memory. The second transmission terminal receives the real-time data packet sent by the first transmission terminal, judges the abnormal state of the received real-time data packet, and actively generates the video timing control signal if it is judged that the real-time data packet is abnormal. No matter whether the real-time data packet received by the second transmission terminal is abnormal or not, retransmission control information is not generated.

Preferably, the real-time data packet does not contain a serial number, or the serial number in the real-time data packet is a fixed value.

Preferably, a method for judging the abnormal state of the real-time data packet is: the second transmission terminal judging whether the real-time data packet is correctly received within the first preset time interval.

Preferably, the method for judging the abnormal state of the retransmittable data packet is: the second transmission terminal judging whether the retransmittable data packet is correctly received and whether the serial numbers are continuous.

Preferably, the method for judging the abnormal state of the retransmittable data packet is: after correctly receiving a retransmittable data packet, the second transmission terminal judging whether the next retransmittable data packet has not been correctly received after a second preset time.

Preferably, the method for judging the abnormal state of the retransmittable data packet is: after sending the retransmission control information, the second transmission terminal judging whether the retransmittable data packet with the same serial number as that in the retransmission control information has not been correctly received after a third preset time.

The present application has the following beneficial effects:

the video transmission system with physical layer retransmission and real-time transmission functions can transmit both retransmittable data packets and real-time data packets in the physical layer, so that the system has the ability to transmit low-delay high-reliability video data and high-real-time video timing control signals at the same time.

BRIEF DESCRIPTION OF DRAWINGS

FIG. 9 is a data retransmission flow chart of a video transmission system with physical layer retransmission and real-time transmission functions according to the present application, which is another method for the second transmission terminal to judge the abnormal state of the retransmittable data packet;

FIG. 10 is a data retransmission flow chart of a video transmission system with physical layer retransmission and real-time transmission functions according to the present application, which is still another method for the second transmission terminal to judge the abnormal state of the retransmittable data packet.

In the figures:

Figure 1:
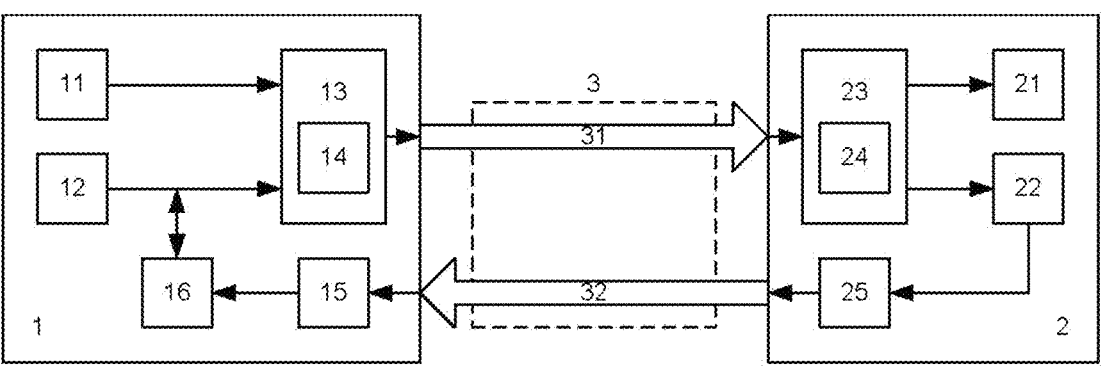
FIG. 1 is a system block diagram of a video transmission system with physical layer retransmission and real-time transmission functions of the present application.

1 First transmission terminal
2 Second transmission terminal
3 Transmission channel
11 Real-time data source
12 Retransmittable data source
13 Downlink data packet transmission unit
14 Check code coding unit
15 Retransmission control information receiving unit
16 Transmission memory
21 Real-time data trap
22 Retransmittable data trap
23 Downlink data packet receiving unit
24 Check code decoding unit
25 Retransmission control information transmission unit
31 Downlink transmission channel
32 Uplink transmission channel
S1 Data packet header
S2 Data packet payload
S3 Check code
S11 Data packet type field
S12 Serial number field

DESCRIPTION OF EMBODIMENTS

The technical solution in the embodiment of the present application will be described clearly and completely with the attached drawings. It can be understood that the described embodiment is only a part of the embodiment of the present application, but not the whole embodiment. Based on the embodiments of the present application, all other embodiments obtained by those skilled in the art without creative work belong to the scope of protection of the present application.

As shown in FIG. 1, in an application embodiment of a video transmission system with physical layer retransmission and real-time transmission functions, the data transmission system includes a first transmission terminal 1, a second transmission terminal 2, and a transmission channel 3. The first transmission terminal 1 sends downlink data packets to the second transmission terminal 2 through the transmission channel 3, and the second transmission terminal 2 sends retransmission control information to the first transmission terminal 1 through the transmission channel 3.

The first transmission terminal 1 includes a real-time data source 11, a retransmittable data source 12, a downlink data packet transmission unit 13, a retransmission control information receiving unit 15, and a transmission memory 16, wherein the downlink data packet transmission unit 13 includes a check code encoding unit 14; the second transmission terminal 2 includes a real-time data trap 21, a retransmittable data trap 22, a downlink data packet receiving unit 23 and a retransmission control information transmission unit 25, wherein the downlink data packet receiving unit 23 includes a check code decoding unit 24; the transmission channel 3 includes a downlink transmission channel 31 and an uplink transmission channel 32.

The downlink data packet includes a retransmittable data packet and a real-time data packet; the real-time data source 11 in the first transmission terminal 1 generates real-time data packets, and the retransmission data source 12 generates retransmittable data packets; the real-time data trap 21 in the second transmission terminal 2 processes real-time data packets, and the retransmission data trap 22 processes retransmittable data packets.

When the first transmission terminal 1 sends a retransmittable data packet to the second transmission terminal 2, it reads the retransmittable data packet from the retransmission data source 12 and sends it to the downlink data packet transmission unit 13, and stores the retransmittable data packet in the transmission memory 16; when the first transmission terminal 1 sends a real-time data packet to the second transmission terminal 2, it reads the real-time data packet from the real-time data source 11 and sends it to the downlink data packet transmission unit 13 without storing the real-time data packet in the transmission memory 16.

The check code encoding unit 14 is used for checking code encoding of downlink data packets, and the check code decoding unit 24 is used for checking code decoding of downlink data packets. Check codes include error detection codes and error correction codes, and commonly used ones include cyclic redundancy codes, parity codes, Hamming codes, convolutional codes, Reed-Solomon codes (RS codes), BCH codes and LDPC codes. Correctly receiving the downlink data packet means that after decoding the check code of the downlink data packet, the result shows that the downlink data packet containing the error detection code has not detected an error, or the error correction result of the downlink data packet containing the error correction code is correct.

After the check code encoding unit 14 performs check code encoding on the downlink data packet, the downlink data packet transmission unit 13 sends the encoded downlink data packet to the downlink data packet receiving unit 23 through the downlink transmission channel 31; the check code decoding unit 24 performs check code decoding on the downlink data packet, and the downlink data packet that is incorrectly decoded is discarded; the downlink data packet receiving unit 23 parses the correctly received downlink data packet to distinguish the retransmittable data packet from the real-time data packet, sends the retransmittable data packet to the retransmittable data trap 22, and sends the real-time data packet to the real-time data trap 21.

The retransmission data trap 22 judges the abnormal state of the received retransmittable data packet. If the retransmittable data packet is abnormal, the retransmission control information transmission unit 25 sends retransmission control information through the uplink transmission channel 32, and the retransmission control information includes the serial number of the retransmittable data packet to be retransmitted. After receiving the retransmission control information, the retransmission control information receiving unit 15 in the first transmission terminal 1 reads the retransmittable data packet with the same serial number as that in the retransmission control information from the transmission memory 16 and retransmits the retransmittable data packet to the second transmission terminal 2 through the downlink transmission channel 31.

The real-time data trap 21 judges the abnormal state of the received real-time data packet, and does not generate retransmission control information regardless of whether the real-time data packet is abnormal.

Figure 2:
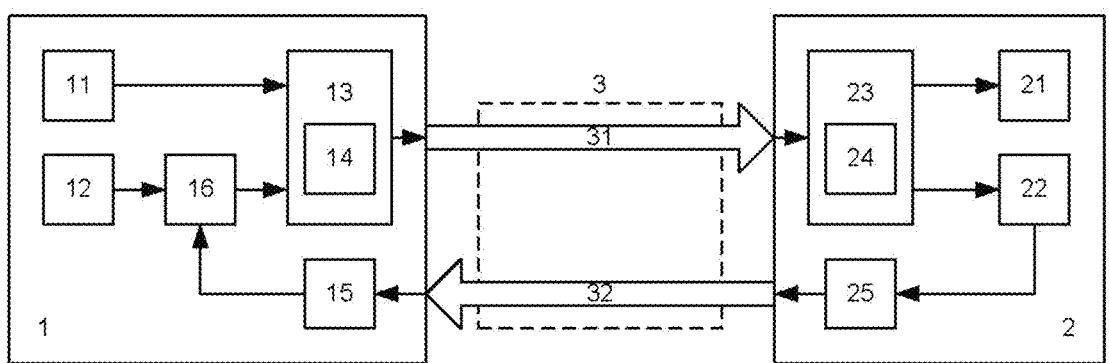
FIG. 2 is another system block diagram of a video transmission system with physical layer retransmission and real-time transmission functions according to the present application.

As shown in FIG. 2, in another application embodiment of a video transmission system with physical layer retransmission and real-time transmission functions of the present application, the difference from the embodiment shown in FIG. 1 is that when a first transmission terminal 1 sends a retransmittable data packet to a second transmission terminal 2, the retransmittable data packet is read from a retransmission data source 12 and stored in a transmission memory 16, and then read from the transmission memory 16 and sent to a downlink data packet transmission unit 13.

Figure 3:
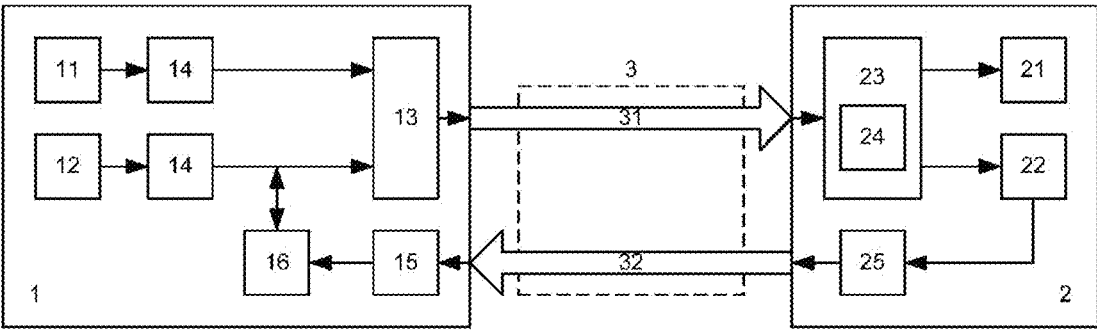
FIG. 3 is another system block diagram of a video transmission system with physical layer retransmission and real-time transmission functions according to the present application.

As shown in FIG. 3, in another application embodiment of a video transmission system with physical layer retransmission and real-time transmission functions of the present application, the difference from the embodiment shown in FIG. 1 is that the real-time data packet read from the real-time data source 11 and the retransmittable data packet read from the retransmittable data source 12 are respectively subjected to check code encoding by the check code encoding unit 14 and sent to the downlink data packet transmission unit 13. The encoded retransmittable data packets are stored in the transmission memory 16 at the same time, and the downlink data packet transmission unit 13 does not include the check code encoding unit 14, and the downlink data packet transmission unit 13 does not encode the check code any more.

Figure 4:
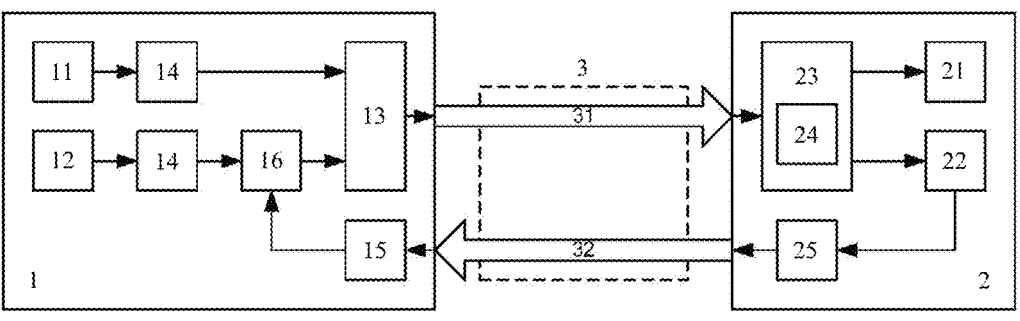
FIG. 4 is still another system block diagram of a video transmission system with physical layer retransmission and real-time transmission functions according to the present application.

As shown in FIG. 4, in another application embodiment of a video transmission system with physical layer retransmission and real-time transmission functions of the present application, the difference from the embodiment shown in FIG. 2 is that the real-time data packet read from the real-time data source 11 is subjected to check code encoding by the check code coding unit 14 and sent to the downlink data packet transmission unit 13. The retransmittable data packet read from the retransmittable data source 12 is subjected to check code encoding by the check code coding unit 14 and stored in the transmission memory 16, and then the coded retransmittable data packet is read from the transmission memory 16 and sent to the downlink data packet transmission unit 13; the downlink data packet transmission unit 13 does not include the check code coding unit 14, and the downlink data packet transmission unit 13 does not code the downlink data packet any more.

Real-time data packets have the characteristics of high real-time transmission, which means that the time delay from sending a real-time data packet from the sending terminal to receiving it at the receiving terminal is fixed or has little change, that is, after sending the real-time data packet, it can be predicted that the real-time data packet will arrive at the receiver within a small time interval. In the field of video transmission, the real-time performance of video timing control signals is required to generate video signals correctly at the receiving terminal.

In an application embodiment of the present application, real-time data packets are used to transmit video timing control signals, which include one or more of frame synchronization signals, field synchronization signals and line synchronization signals. Because real-time data packets cannot be retransmitted, the reliability of transmission cannot be guaranteed. The second transmission terminal 2 judges the abnormal state of the real-time data packet, and if it is judged that the real-time data packet is abnormal, it actively generates video timing control signals. The method for judging the abnormal state of the real-time data packet is that the second transmission terminal judges whether the real-time data packet is correctly received within a first preset time interval.

In an application embodiment of the present application, the video timing control signal is a frame synchronization signal to indicate the start time of a frame of video, and the time interval between two adjacent frame synchronization signals is basically the same.

In order to ensure the real-time performance of the frame synchronization signal, when the first transmission terminal 1 sends the downlink data packet, the real-time data packet has a higher priority than the retransmittable data packet, so as to ensure that the time interval from generation to transmission of the real-time data packet is basically the same.

Figure 5:
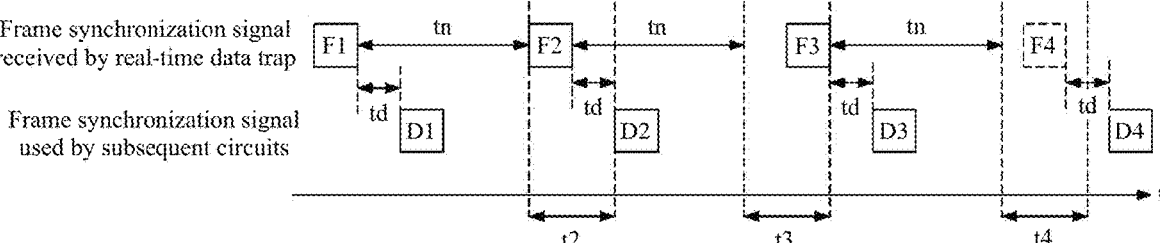
FIG. 5 is a schematic diagram of a video transmission system with physical layer retransmission and real-time transmission functions, which receives and actively generates a frame synchronization signal.

As shown in FIG. 5, after receiving the first frame synchronization signal F1, the real-time data trap 21 delays it by td to form a frame synchronization signal D1 for subsequent circuits; the real-time data trap 21 delays tn after receiving F1, searches for the frame synchronization signal in the time interval t2, and after searching for the frame synchronization signal F2, it delays td to form the frame synchronization signal D2 for subsequent circuits; similarly, after receiving F2, the real-time data trap 21 delays tn, searches for the frame synchronization signal in the time interval t3, and after searching for the frame synchronization signal F3, it delays td to form the frame synchronization signal D3 for subsequent circuits; after receiving F3, the real-time data trap 21 delays tn, and searches for the frame synchronization signal in the time interval t4, but fails to find the frame synchronization signal (the frame synchronization signal F4 is lost), and the real-time data trap 21 can actively generate the frame synchronization signal D4 for subsequent circuits, which is delayed by td relative to F4 that should have been received in the time interval t4. In this embodiment, when receiving frame synchronization signals F2, F3 and F4, the first preset time intervals are t2, t3 and t4, respectively. Although frame loss may occur when transmitting real-time data packets, the frame synchronization signals D1 to D4 provided by the second transmission terminal 2 for subsequent circuits still ensure a relatively close time interval, thus ensuring the real-time performance of the frame synchronization signals.

In order to simplify the processing of downlink data packets in the physical layer and facilitate the coding and decoding of downlink data packets, the retransmittable data packets and real-time data packets adopt the same length. Further, the structure of the retransmittable data packet is the same as that of the real-time data packet, both of which contain a data packet header, a data packet payload and a check code field, and the data length of the same field in the retransmittable data packet and the real-time data packet may be the same or different.

Figure 6:
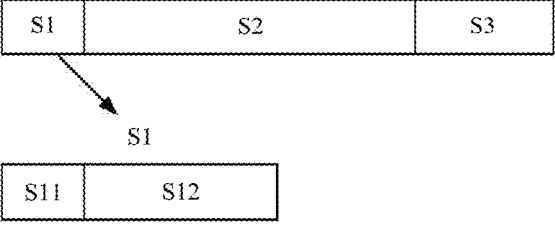
FIG. 6 is a schematic structural diagram of a downlink data packet in a video transmission system with physical layer retransmission and real-time transmission functions according to the present application.

FIG. 6 is a schematic structural diagram of a downlink data packet, including a data packet header S1, a data packet payload S2, and a check code S3, wherein the data packet header S1 contains a data packet type field S11 and a serial number field S12.

The data packet type field S11 is used to distinguish between a retransmittable data packet and a real-time data packet. After the check code decoding unit 24 decodes the downlink data packet, the downlink data packet receiving unit 23 parses the data packet type field S11 in the correctly received downlink data packet to distinguish between the retransmittable data packet and the real-time data packet.

The serial number field S12 stores the serial number, and each retransmittable data packet contains one serial number. If the serial number of the retransmittable data packet is n, the retransmittable data packet is recorded as a retransmittable data packet (n). A plurality of serial numbers contained in a plurality of consecutive retransmittable data packets are arranged in the order of transmission. For example, when all the retransmittable data packets can be correctly received by the second transmission terminal 2, the serial number of the retransmittable data packet sent by the first transmission terminal 1 each time is the serial number of the retransmittable data packet sent by the first transmission terminal 1 the previous time plus 1, and when it is added to the preset maximum value, the serial number of the next retransmittable data packet is 0. If the first transmission terminal 1 sends a retransmittable data packet (n), the retransmittable data packet (n+1), the retransmittable data packet (n+2), the retransmittable data packet (n+3), . . . will be sent subsequently in turn. If the preset maximum value of the serial number of the retransmittable data packet is Nmax, and the first transmission terminal 1 sends the retransmittable data packet (Nmax), and the retransmittable data packet (0), the retransmittable data packet (1), the retransmittable data packet (2), . . . will be sent subsequently in turn.

The real-time data packet does not contain the serial number, or the serial number in the real-time data packet is a fixed value. In this embodiment, the serial number field S12 in the real-time data packet is a fixed value of 0.

In an application embodiment of the present application, the flow of the first transmission terminal 1 sending the retransmittable data packet and the second transmission terminal 2 correctly receiving the retransmittable data packet is shown.

Figure 7:
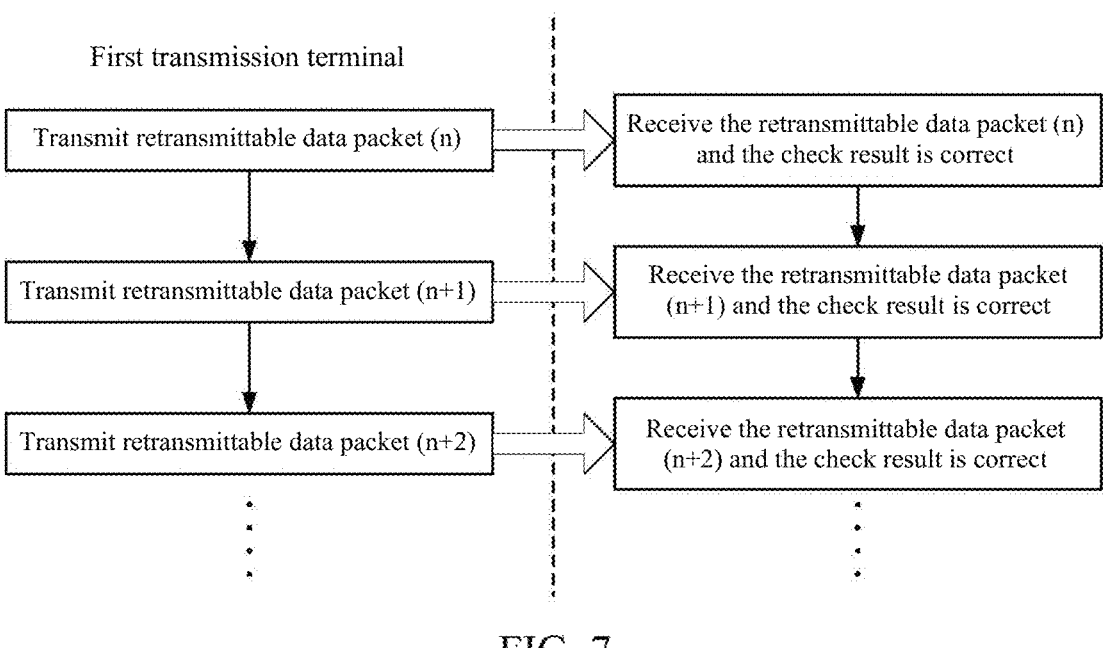
FIG. 7 is a flow chart of receiving and sending correct data by a video transmission system with physical layer retransmission and real-time transmission functions according to the present application.

As shown in FIG. 7, the first transmission terminal 1 sends the retransmittable data packet (n) through the transmission channel 3, and the second transmission terminal 2 receives the retransmittable data packet (n) and checks the retransmittable data packet (n). If the check result is correct, the second transmission terminal 2 waits to receive the next retransmittable data packet (n+1) sent by the first transmission terminal 1. The first transmission terminal 1 sends retransmittable data packets (n+1), retransmittable data packets (n+2) and other retransmittable data packets with serial numbers after n to the second transmission terminal 2, and the second transmission terminal 2 receives these retransmittable data packets and checks them, and the check result is correct.

If the serial number of the retransmittable data packet to be retransmitted contained in the retransmission control information is n, the retransmission control information is recorded as retransmission control information (n).

The present application only performs retransmission control on the wrong retransmittable data packet, and does not perform feedback confirmation on the correct retransmittable data packet. This method is mostly used in asymmetric transmission systems, and the transmission channels in asymmetric transmission systems are divided into uplink transmission channels and downlink transmission channels, which are used for transmitting uplink data and downlink data respectively. In an asymmetric transmission system, the uplink data transmission rate is different from the downlink data transmission rate, therefore the bandwidth of the uplink transmission channel is different from that of the downlink transmission channel. In one embodiment of the present application, the downlink data transmission rate is greater than the uplink data transmission rate, therefore the bandwidth of the downlink transmission channel is greater than that of the uplink transmission channel. Retransmission control only for erroneous data packets is beneficial to sending retransmission control information in time through the uplink transmission channel with small bandwidth.

An application embodiment of the present application provides a method for the second transmission terminal 2 to judge the abnormal state of the retransmittable data packet: the second transmission terminal 2 judges whether the retransmittable data packet is correctly received and whether the serial numbers are continuous.

Figure 8:
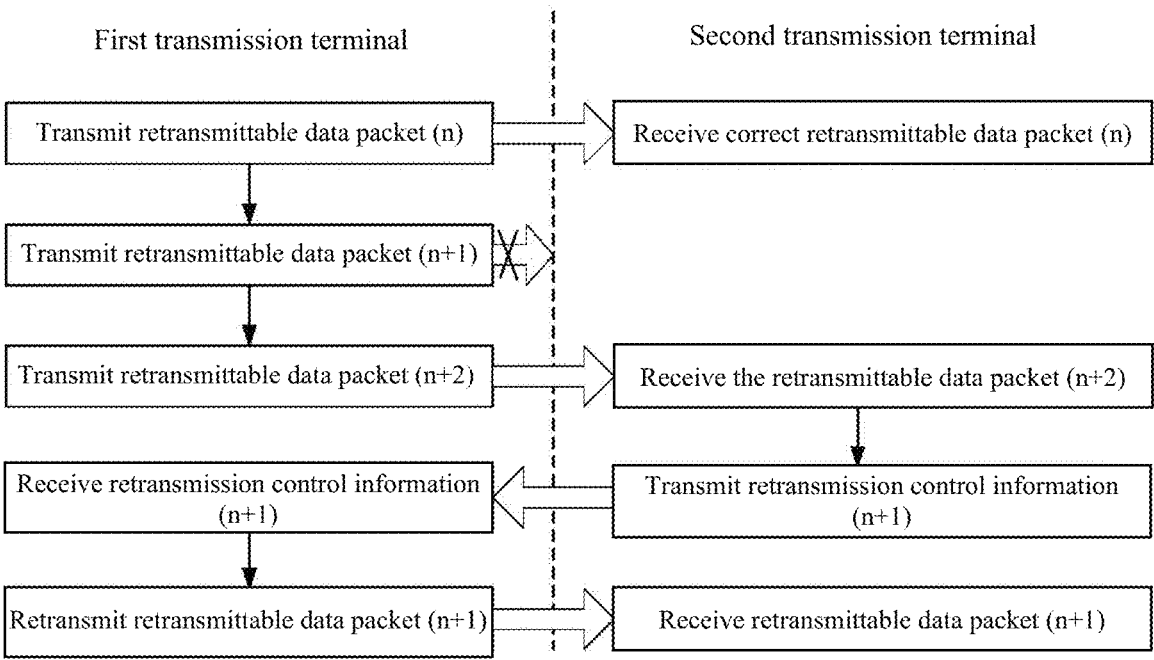
FIG. 8 is a data retransmission flow chart of a video transmission system with physical layer retransmission and real-time transmission functions according to the present application, and a method for the second transmission terminal to judge the abnormal state of the retransmittable data packet.

As shown in FIG. 8, the first transmission terminal 1 sends a retransmittable data packet (n) to the second transmission terminal 2, and the second transmission terminal 2 receives the correct retransmittable data packet (n). The first transmission terminal 1 sent a retransmittable data packet (n+1), but the retransmittable data packet (n+1) is incorrectly received by the second transmission terminal 2 due to an error during transmission. The first transmission terminal 1 sends the retransmittable data packet (n+2), and the second transmission terminal 2 receives the correct retransmittable data packet (n+2). The second transmission terminal 2 determines that the retransmittable data packet (n+1) has an error because the serial numbers n and n+2 of the received correct retransmittable data packet are discontinuous, and the second transmission terminal 2 sends retransmission control information (n+1) to the first transmission terminal 1. After receiving the retransmission control information (n+1), the first transmission terminal 1 retransmits the retransmittable data packet (n+1), and the second transmission terminal 2 receives the retransmittable data packet (n+1).

An application embodiment of the present application provides another method for the second transmission terminal 2 to judge the abnormal state of a retransmittable data packet: after the second transmission terminal 2 correctly receives a retransmittable data packet, it judges whether the next retransmittable data packet has not been correctly received after a second preset time.

As shown in FIG. 9, the first transmission terminal 1 sends a retransmittable data packet (n) to the second transmission terminal 2, and the second transmission terminal 2 waits to receive the retransmittable data packet (n+1) after receiving the correct retransmittable data packet (n). The first transmission terminal 1 sends retransmittable data packets (n+1) and retransmittable data packets (n+2) with serial numbers after n to the second transmission terminal 2, but these retransmittable data packets are incorrectly received by the second transmission terminal 2 due to errors during transmission. The second transmission terminal 2 has not received the retransmittable data packet (n+1) after a second preset time, and determines that the retransmittable data packet (n+1) has an error, and the second transmission terminal 2 sends retransmission control information (n+1) to the first transmission terminal 1. After receiving the retransmission control information (n+1), the first transmission terminal 1 retransmits the retransmittable data packet (n+1), and the second transmission terminal 2 receives the retransmittable data packet (n+1).

Another application embodiment of the present application provides another method for the second transmission terminal 2 to judge the abnormal state of the retransmittable data packet: when the second transmission terminal 2 sends the retransmission control information, it judges whether the retransmittable data packet with the same serial number as that in the retransmission control information has not been correctly received after a third preset time.

As shown in FIG. 10, the retransmittable data packet (n) sent by the first transmission terminal 1 is not correctly received by the second transmission terminal 2 due to an error in the transmission process. After judging that the retransmittable data packet (n) is in error, the second transmission terminal 2 sends retransmission control information (n) to the first transmission terminal 1, waiting to receive the retransmitted retransmittable data packet (n). After receiving the retransmission control information (n), the first transmission terminal 1 retransmits the retransmittable data packet (n) to the second transmission terminal 2, but the retransmittable data packet (n) is still not correctly received by the second transmission terminal 2 due to an error in the transmission process. The second transmission terminal 2 still does not receive the retransmittable data packet (n) after the third preset time, judges that the retransmittable data packet (n) has an error, and sends retransmission control information (n) to the first transmission terminal 1 again. After receiving the retransmission control information (n), the first transmission terminal 1 retransmits the retransmittable data packet (n), and the second transmission terminal 2 receives the retransmittable data packet (n).

The above is only the preferred embodiment of the present application, but the protection scope of the present application is not limited to this, and any changes or substitutions that can be easily thought of by those familiar with the technical field within the technical scope disclosed by the present application should be included in the protection scope of the present application.

What is claimed is:

1. A video transmission system with physical layer retransmission and real-time transmission functions, comprising a first transmission terminal, a second transmission terminal and a transmission channel, wherein the first transmission terminal sends a downlink data packet to the second transmission terminal through the transmission channel, and the second transmission terminal sends retransmission control information to the first transmission terminal through the transmission channel;

wherein, the downlink data packet comprises a retransmittable data packet and a real-time data packet, wherein the real-time data packet is used for transmitting video timing control signals, the first transmission terminal comprises a transmission memory, the first transmission terminal stores the retransmittable data packet into the transmission memory, and transmits the retransmittable data packet to the second transmission terminal, wherein the retransmittable data packet comprises a serial number, and a plurality of serial numbers contained in a plurality of consecutive retransmittable data packets are arranged in sequence according to a transmission order, the second transmission terminal receives the retransmittable data packet sent by the first transmission terminal, judges an abnormal state of the received retransmittable data packet, and generates retransmission control information if it is judged that the retransmittable data packet is abnormal, wherein the retransmission control information comprises the serial number of the retransmittable data packet to be retransmitted, and the first transmission terminal retransmits the retransmittable data packet to the second transmission terminal according to the retransmission control information, the first transmission terminal sends the real-time data packet to the second transmission terminal, the second transmission terminal receives the real-time data packet sent by the first transmission terminal, and does not generate retransmission control information regardless of whether the received real-time data packet is abnormal or not, wherein if the second transmission terminal judges that the received retransmittable data packet is a correct retransmittable data packet being correctly received, the second transmission terminal does not perform feedback confirmation on the correct retransmittable data packet.

2. The video transmission system with physical layer retransmission and real-time transmission functions according to claim 1, wherein, the downlink data packet contains a data packet type field to distinguish the retransmittable data packet from the real-time data packet.

3. The video transmission system with physical layer retransmission and real-time transmission functions according to claim 1, wherein, the retransmittable data packet has a same length as the real-time data packet.

4. The video transmission system with physical layer retransmission and real-time transmission functions according to claim 1, wherein, the retransmittable data packet has a same structure as the real-time data packet, and both the retransmittable data packet and the real-time data packet contain a data packet header, a data packet payload, a check code field, a same field in the retransmittable data packet has a same data length as the real-time data packet.

5. The video transmission system with physical layer retransmission and real-time transmission functions according to claim 1, wherein, when the first transmission terminal sends the downlink data packet, the real-time data packet has a higher priority than the retransmittable data packet.

6. The video transmission system with physical layer retransmission and real-time transmission functions according to claim 1, wherein, when the first transmission terminal sends the real-time data packet to the second transmission terminal, the real-time data packet is not stored in the transmission memory.

7. The video transmission system with physical layer retransmission and real-time transmission functions according to claim 1, wherein, the real-time data packet does not contain a serial number, or the serial number in the real-time data packet is a fixed value.

8. The video transmission system with physical layer retransmission and real-time transmission functions according to claim 1, wherein, the video timing control signal comprises one or more of a frame synchronization signal, a field synchronization signal and a line synchronization signal.

9. The video transmission system with physical layer retransmission and real-time transmission functions according to claim 1, wherein, the second transmission terminal judges the abnormal state of the real-time data packet, and if it is judged that the real-time data packet is abnormal, the second transmission terminal actively generates the video timing control signals.

10. The video transmission system with physical layer retransmission and real-time transmission functions according to claim 9, wherein, a method for judging the abnormal state of the real-time data packet comprises the following steps: the second transmission terminal judging whether the real-time data packet is correctly received within a first preset time interval.

11. The video transmission system with physical layer retransmission and real-time transmission functions according to claim 1, wherein, the method for judging the abnormal state of the retransmittable data packet comprises the following steps: the second transmission terminal judging whether the retransmittable data packets are correctly received and whether the serial numbers are continuous.

12. The video transmission system with physical layer retransmission and real-time transmission functions according to claim 1, wherein, the method for judging the abnormal state of a retransmittable data packet comprises the following steps: after the second transmission terminal correctly receives a retransmittable data packet, judging whether a next retransmittable data packet has not been correctly received after a second preset time.

13. The video transmission system with physical layer retransmission and real-time transmission functions according to claim 1, wherein, the method for judging the abnormal state of the retransmittable data packet comprises the following steps: after the second transmission terminal sends the retransmission control information, judging whether the retransmittable data packet with a same serial number as that in the retransmission control information has not been correctly received after a third preset time.

\* \* \* \* \*